(12) United States Patent
Sorkin

(10) Patent No.: US 12,479,052 B2
(45) Date of Patent: Nov. 25, 2025

(54) METHOD AND APPARATUS FOR PLASMA CABLE CUTTING

(71) Applicant: Felix Sorkin, Stafford, TX (US)

(72) Inventor: Felix Sorkin, Stafford, TX (US)

( * ) Notice: Subject to any disclaimer, the term of this patent is extended or adjusted under 35 U.S.C. 154(b) by 0 days.

(21) Appl. No.: 18/936,632

(22) Filed: Nov. 4, 2024

(65) Prior Publication Data

US 2025/0144751 A1 May 8, 2025

Related U.S. Application Data

(60) Provisional application No. 63/595,845, filed on Nov. 3, 2023.

(51) Int. Cl.
*B23K 37/02* (2006.01)
*B23K 37/04* (2006.01)

(52) U.S. Cl.
CPC .......... *B23K 37/0241* (2013.01); *B23K 37/04* (2013.01)

(58) Field of Classification Search
CPC .......... B23K 7/10; B23K 10/02; B23K 10/00; B23K 37/04; B23K 37/0241
USPC .................................................. 219/121.39
See application file for complete search history.

(56) References Cited

U.S. PATENT DOCUMENTS

| | | | | |
|---|---|---|---|---|
| 4,691,090 A | * | 9/1987 | Garlanov | B23K 10/00 83/16 |
| 5,436,425 A | * | 7/1995 | Sorkin | B23K 10/00 219/121.48 |
| 6,040,546 A | * | 3/2000 | Sorkin | B23K 9/0026 219/121.67 |
| 6,393,781 B1 | * | 5/2002 | Sorkin | E04G 15/04 52/223.13 |
| 2003/0052095 A1 | * | 3/2003 | Sanders | B23K 10/00 219/121.51 |

OTHER PUBLICATIONS

International Search Report and Written Opinion dated Dec. 31, 2024 received in related PCT/US2024/054430, 11 pages.

* cited by examiner

*Primary Examiner* — Ibrahime A Abraham
*Assistant Examiner* — Joseph W Iskra
(74) *Attorney, Agent, or Firm* — HUNTON ANDREWS KURTH LLP

(57) ABSTRACT

An apparatus may include a bracket having a post-tensioned cable tunnel and a pair of tabs configured to receive a post-tensioned cable and to prevent rotation of the bracket relative to the post-tensioned cable. An apparatus may include a plasma torch attachment member configured to releasably engage with the head of a plasma cutting torch of the type having a plasma cutting tip attached thereto, and to rotatably attach to the bracket such that the plasma cutting tip may be moved in an arc relative to the post-tensioned cable.

16 Claims, 3 Drawing Sheets

METHOD AND APPARATUS FOR PLASMA CABLE CUTTING

CROSS-REFERENCE TO RELATED APPLICATIONS

This application claims priority to U.S. provisional application Ser. No. 63/595,845 filed Nov. 3, 2023 which application is incorporated herein by reference. This application is also Related to U.S. Pat. Nos. 5,436,425 and 10,717,159, both of which are incorporated herein by reference.

FIELD OF THE DISCLOSURE

The present disclosure relates to a method and apparatus for cutting cables, especially post-tensioned cables used in concrete structures, utilizing a plasma cutting torch.

BACKGROUND INFORMATION

Many structures are built using concrete, including, for instance, buildings, parking structures, apartments, condominiums, hotels, mixed-use structures, casinos, hospitals, medical buildings, government buildings, research/academic institutions, industrial buildings, malls, bridges, pavement, tanks, reservoirs, silos, foundations, sports courts, and other structures.

Pre-stressed concrete is structural concrete in which internal stresses are introduced to reduce potential tensile stresses in the concrete resulting from applied loads. Pre-stressing may be accomplished by post-tensioned pre-stressing or pre-tensioned prestressing. In post-tensioned pre-stressing, a tension member is tensioned after the concrete has attained a desired strength by use of a post-tensioning tendon. The post-tensioning tendon may include for example and without limitation, anchor assemblies, the tension member, and sheathes.

Traditionally, a tension member is constructed of a material that can be elongated and may be a single or a multi-strand cable. The tension member may be formed from a metal, such as reinforced steel. The post-tensioning tendon traditionally includes an anchor assembly at each end. The tension member is fixedly coupled to a fixed anchor assembly positioned at one end of the post-tensioning tendon, the "fixed end," and stressed at the stressed anchor assembly positioned at the opposite end of the post-tensioning tendon, the "stressing end" of the post-tensioning tendon.

In a typical tendon tensioning anchor assembly in post-tensioning operations, there are provided anchors for anchoring the ends of the cables suspended therebetween. In the course of installing the cable tensioning anchor assembly in a concrete structure, a hydraulic jack or the like is releasably attached to one of the exposed ends of cable (the stressing end) for applying a predetermined amount of tension to the tendon. When the desired amount of tension is applied to the cable, wedges, threaded nuts, or the like, are used to capture the cable and, as the jack is removed from the tendon, to prevent its relaxation and hold it in its stressed condition.

After the concrete member is stressed, the tension member extends beyond the edge of the concrete segment. Conventionally, at least a portion of the tension member that extends beyond the edge of the concrete member is removed by cutting.

Traditional methods of cutting the tension member include using an abrasive saw or an arm with a sharp edge that cuts the cable. Both the sharp edge and the saw may leave the cut end of the tension member frayed. Use of the abrasive saw also tends to produce dust. Cutting the tension member using traditional methods may take 20-25 seconds or longer.

Other traditional cutting methods include a conventional acetylene torch or cutting torch. However, use of the open flame of a torch creates some danger of fire or explosion in the surrounding environment. Also, cutting the metal cable with a torch at a point near to the tensioning wedges causes the cable and wedges to become heated and may result in a loss of temper of the metal or loosening of the post-tensioning wedges.

Thus, it may be beneficial to provide a method and apparatus for severing the free end of a post-tensioned cable or tendon at a point near the tensioning wedges without fraying the cable or tendon, without substantially heating the cable and tensioning wedges, and without producing metal dust. It may further be beneficial to provide such a method and apparatus in which the cable can be cut at the desired location without damaging the post-tensioned concrete body.

SUMMARY OF EXEMPLARY EMBODIMENTS

The following is intended to be a brief summary of the exemplary embodiments of the present disclosure, and is not intended to limit the scope of the exemplary embodiments.

In some aspects, the techniques described herein relate to an apparatus for positioning a plasma cutting torch to cut off the free end of a post-tensioned cable embedded in a concrete body, said apparatus including: a bracket having a post-tensioned cable tunnel and a pair of tabs configured to receive the post-tensioned cable and to prevent rotation of the bracket relative to the post-tensioned cable; and a plasma torch attachment member configured to: releasably engage with the head of a plasma cutting torch of the type having a plasma cutting tip attached thereto; and rotatably attach to the bracket such that the plasma cutting tip may be moved in an arc relative to the post-tensioned cable.

In some aspects, the techniques described herein relate to an apparatus, wherein each tab of the pair of tabs has an exterior sloping face configured to provide a force for flexing the pair of tabs apart when the bracket is pushed against the post-tensioned cable.

In some aspects, the techniques described herein relate to an apparatus, wherein each tab of the pair of tabs has an interior face configured to create a retention force when the post-tensioned cable is seated in the post-tensioned cable tunnel.

In some aspects, the techniques described herein relate to an apparatus, wherein the pair of tabs is further configured to allow the bracket to slide along a longitudinal axis of the post-tensioned cable.

In some aspects, the techniques described herein relate to an apparatus, wherein the a distal surface of the bracket is configured to abut a proximal surface of a plurality of cable gripping wedges.

In some aspects, the techniques described herein relate to an apparatus, wherein the arc of the plasma cutting tip is configured to be sufficient to cut the full diameter of the post-tensioned cable without moving the bracket.

In some aspects, the techniques described herein relate to an apparatus, wherein the bracket is configured to position the plasma cutting tip a set distance from a plurality of cable gripping wedges.

In some aspects, the techniques described herein relate to an apparatus, wherein the bracket is configured to position the plasma cutting tip a minimum distance from a circumferential surface of the post-tensioned cable.

In some aspects, the techniques described herein relate to a method for utilizing a plasma cutting torch to cut off the free end of a post-tensioned cable embedded in a concrete structure, said method including: pushing a plasma cutting apparatus onto the post-tensioned cable, the plasma cutting apparatus including: a bracket having a post-tensioned cable tunnel and a pair of tabs configured to receive the post-tensioned cable and to prevent rotation of the bracket relative to the post-tensioned cable; and a plasma torch attachment member configured to releasably engage with the head of a plasma cutting torch of the type having a plasma cutting tip attached thereto and rotatably attach to the bracket such that the plasma cutting tip may be moved in an arc relative to the post-tensioned cable; positioning the bracket along a longitudinal axis of the post-tensioned cable, such positioning defining a cutting point on the post-tensioned cable; and rotating the plasma cutting torch as the torch is engaged to cut the full diameter of the post-tensioned cable.

In some aspects, the techniques described herein relate to a method, wherein each tab of the pair of tabs has an exterior sloping face configured to provide a force for flexing the pair of tabs apart when the bracket is pushed against the post-tensioned cable.

In some aspects, the techniques described herein relate to a method, wherein each tab of the pair of tabs has an interior face configured to create a retention force when the post-tensioned cable is seated in the post-tensioned cable tunnel.

In some aspects, the techniques described herein relate to a method, wherein the pair of tabs is further configured to allow the bracket to slide along a longitudinal axis of the post-tensioned cable.

In some aspects, the techniques described herein relate to a method, wherein the a distal surface of the bracket is configured to abut a proximal surface of a plurality of cable gripping wedges.

In some aspects, the techniques described herein relate to a method, wherein the arc of the plasma cutting tip is configured to be sufficient to cut the full diameter of the post-tensioned cable without moving the bracket.

In some aspects, the techniques described herein relate to a method, wherein the bracket is configured to position the plasma cutting tip a set distance from a plurality of cable gripping wedges.

In some aspects, the techniques described herein relate to a method, wherein the bracket is configured to position the plasma cutting tip a minimum distance from a circumferential surface of the post-tensioned cable.

These and other objects, features and advantages of the exemplary embodiments of the present disclosure will become apparent upon reading the following detailed description of the exemplary embodiments of the present disclosure, when taken in conjunction with the accompanying paragraphs.

BRIEF DESCRIPTION OF THE DRAWINGS

Various embodiments of the present disclosure, together with further objects and advantages, may best be understood by reference to the following description taken in conjunction with the accompanying drawings.

Figure 1:
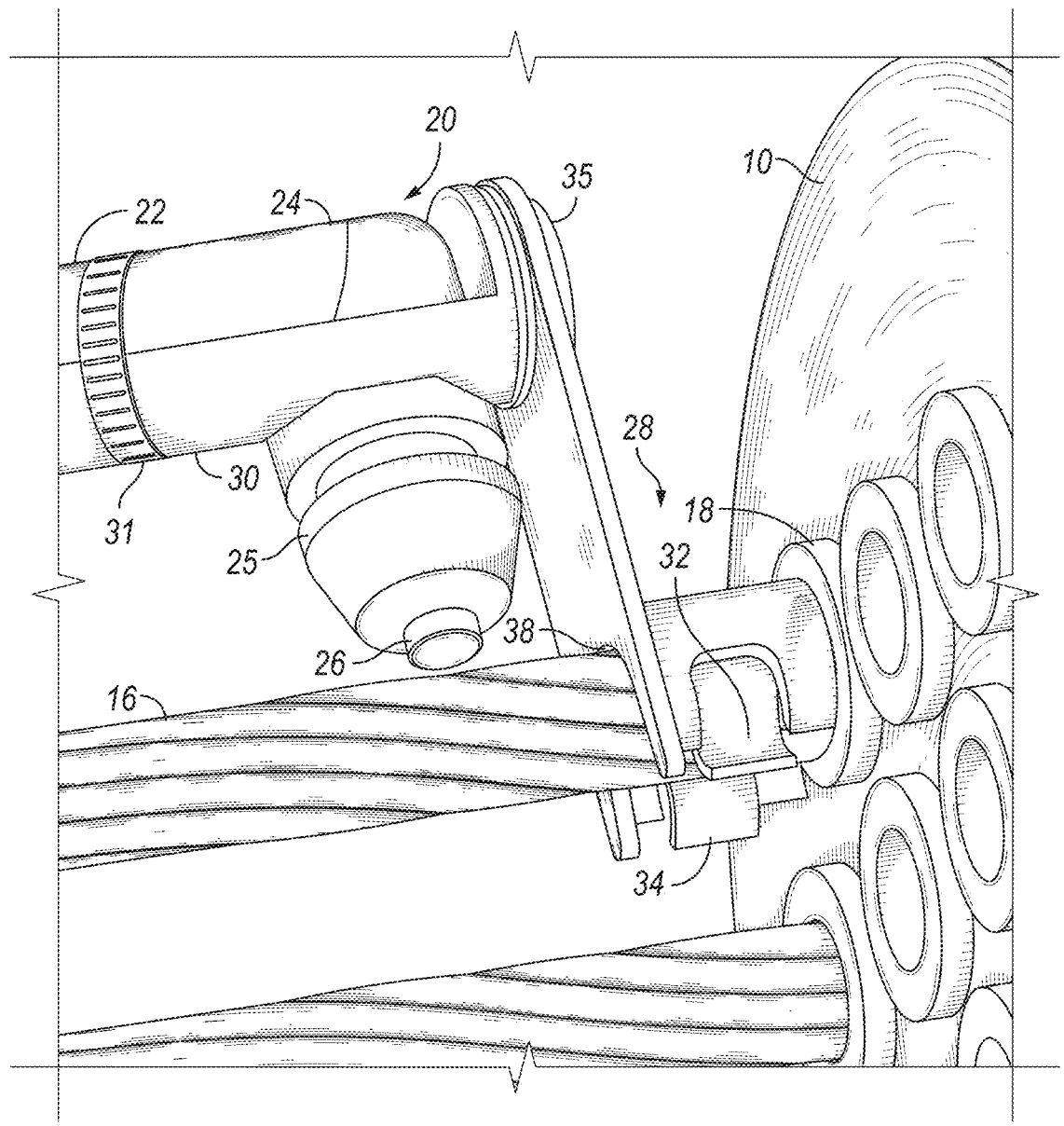
FIG. 1 is a perspective view of a concrete structure with a plasma cutting torch attached to a post-tensioned cable consistent with certain embodiments of the present disclosure.

These and other objects, features and advantages of the exemplary embodiments of the present disclosure will become apparent upon reading the following detailed description of the exemplary embodiments of the present disclosure, when taken in conjunction with the appended paragraphs.

DETAILED DESCRIPTION

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Figure 2:
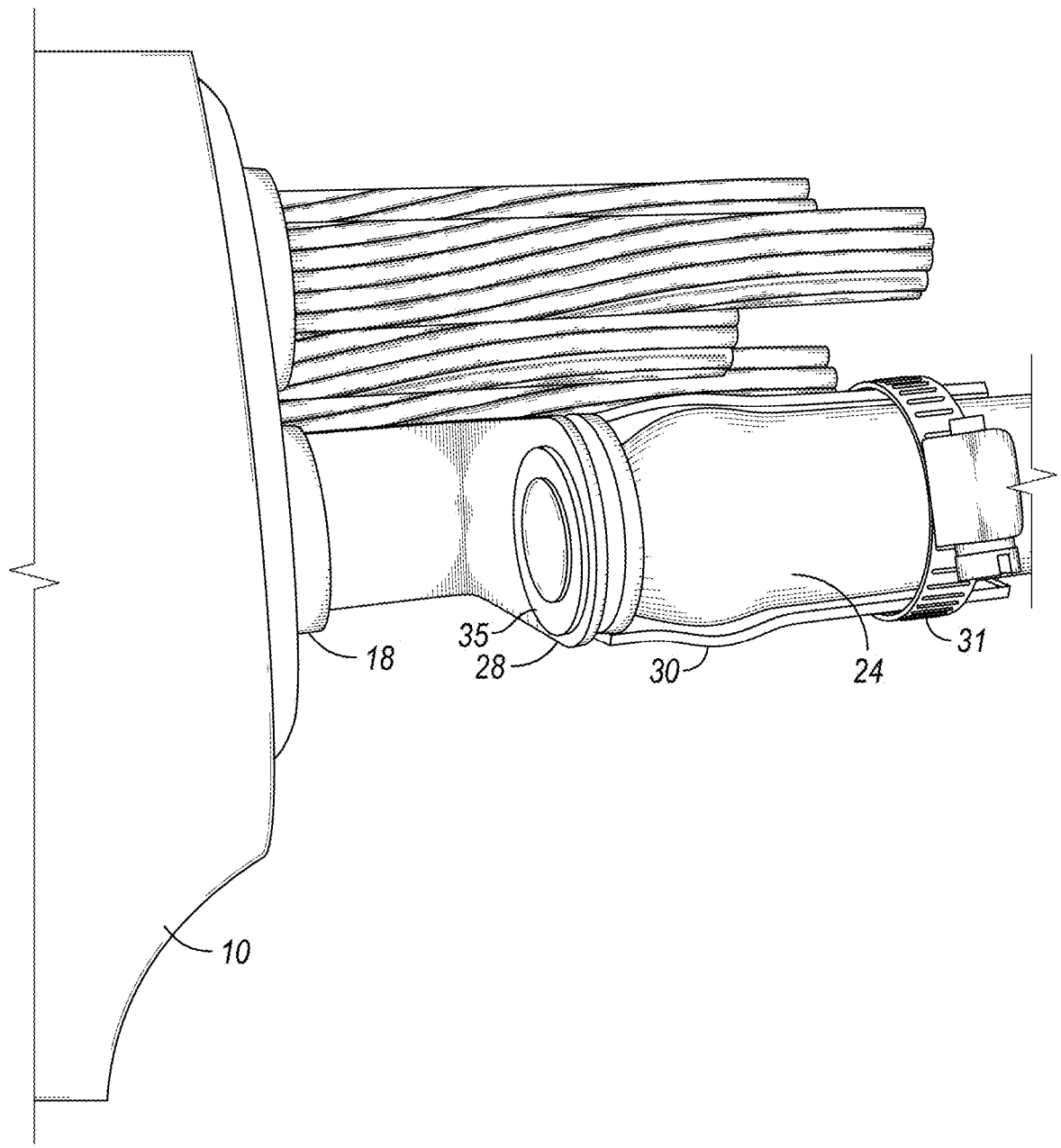
FIG. 2 is a top view of the plasma cutting torch head and attachment of FIG. 1 consistent with certain embodiments of the present disclosure.

Referring to FIGS. 1 and 2, there is shown a concrete slab or other concrete structure 10. A series of post-tensioning cables, including post-tensioned cable 16, extend from concrete structure 10. A post-tensioning anchor (not shown) for each post-tensioning cable is disposed at the face of the concrete structure 10. Post-tensioned cable 16 is imbedded in the concrete structure 10. Its free end extends through the anchor and is held in place by cable gripping wedges 18 seated in the bowl of the post-tensioning anchor and gripping the post-tensioned cable 16 in the usual manner.

In order that the post-tensioning anchor, cable gripping wedges 18 and post-tensioned cable 16 can be protected from the elements, it is desirable to sever the post-tensioned cable 16 near to the face of the cable gripping wedges 18. For this purpose, there preferably is provided a plasma cutting torch 20. The torch 20, only a part of which is shown, is a prior art device which utilizes an air compressor, an electrical power source and electrodes to generate a stream of air, nitrogen or other gaseous plasma at very high temperatures of about 3,000 C.-5,000 C. or more. The stream of superheated gaseous plasma will cut through metal more quickly than an acetylene torch.

The plasma cutting torch shown includes a handle 22, head 24, and cutting tip 26. A ceramic heat shield 25 surrounds a portion of the cutting tip 26. The remaining portions of the torch, not shown, would include a compressor, cylinder or other source for the gas to be formed into the plasma, a source of electrical power and an electrode for converting the gas into a gaseous plasma. The electrode may be disposed in the handle or the head, or in another portion of the plasma torch. A superheated stream of gaseous plasma is discharged from the tip, and generally can cut through metal objects. During cutting, the plasma tip is bent quite close to the surface being cut, the specific desired spacing between the cutting tip and the surface, as well as the thickness of metal which the torch will cut, will vary from case to case. Plasma torches are available from a variety of sources and in a variety of types and sizes.

Since the cutting depth of the plasma torch is restricted, and since the cutting location matters, e.g., in close proximity to the cable gripping wedges 18, means are provided for accurately positioning the cutting tip of the plasma torch with regard to both the post-tensioned cable 16 to be cut and the cable gripping wedges 18.

In the preferred embodiment, the positioning means is a bracket 28 comprising a clamp and a shield member which is releasably engageable with the post-tensioned cable 16. The bracket 28 includes a plasma torch attachment member 30 which is engageable with the cutting head of plasma torch 20. A hole in the plasma torch attachment member 30 may be appropriately sized to receive the ceramic heat shield 25 surrounding the tip 26 of cutting head 24. Plasma torch 20 may be mechanically attached to the plasma torch attachment member 30 by hose clamp 31. Other means of attaching plasma torch 20 to the plasma torch attachment member 30 may be used. Plasma torch attachment member 30 may be rotationally coupled to bracket 28. A portion of plasma torch attachment member 30 may extend through a hole in bracket 28 and be secured by e-clip 35. Other forms of clips may be used such as c-clips, snap rings, etc. Plasma torch attachment member 30, and by extension, plasma torch 20, are constrained by e-clip 35 from movement along a longitudinal axis defined by the hole in bracket 28. Plasma torch attachment member 30 and plasma torch 20 can, however, rotate or twist on the longitudinal axis defined by the hole in bracket 28. Twisting of plasma torch 20 changes the position of cutting tip 26 relative to post-tensioned cable 16 as discussed below.

Positioning means are attached to the bracket 28 and are releasably engageable with the post-tensioned cable 16 for positioning the cutting tip a predetermined distance from the longitudinal axis of the post-tensioned cable 16. That predetermined distance may be optimized for plasma cutting post-tensioned cable 16. In the preferred embodiment, the positioning means comprise a pair of tabs 32, 34 that are integral to bracket 28 but which are also capable of flexing enough to receive post-tensioned cable 16 therebetween. Tabs 32 and 34 each have an exterior sloping face which provides biasing means for flexing tabs 32 and 34 apart when bracket 28 is pushed against post-tensioned cable 16 during installation. For example, when bracket 28 is pressed against post-tensioned cable 16 during installation, post-tensioned cable 16 press the sloping faces of tabs 32 and 34. This causes tabs 32 and 34 to flex outwardly apart from each other thereby creating space for post-tensioned cable 16 to pass therebetween and into a post-tensioned cable tunnel 38 of bracket 28. Post-tensioned cable tunnel 38 may be sized appropriately to receive and firmly hold post-tensioned cable 16 in conjunction with tabs 32 and 34. Tabs 32 and 34 may each have second, interior, faces that partially define the post-tensioned cable tunnel 38 and create a retention force to help hold post-tensioned cable 16 therein. For example, once post-tensioned cable 16 has passed between tabs 32 and 34 and is seated in post-tensioned cable tunnel 38, tabs 32 and 34 may tend to return to their resting (unflexed) position. This may cause tabs 32 and 34 to exert a pinching/squeezing force on post-tensioned cable 16 sufficient to retain post-tensioned cable 16 within post-tensioned cable tunnel 38 and to avoid rotation of bracket 28 relative to post-tensioned cable 16. In some embodiments, bracket 28 may be capable of sliding along a longitudinal axis of post-tensioned cable 16 when installed, for the purpose of locating a cutting position along the length of post-tensioned cable 16. When installed, bracket 28 may also act as shield means for protecting the anchor and cable gripping wedges 18 from any hot metal splatter during the cutting operation.

Figure 3:
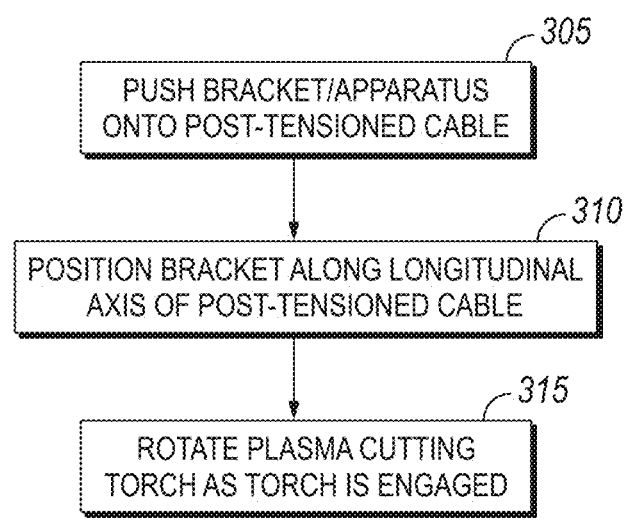
FIG. 3 is a flow diagram illustrating a method of using an apparatus for plasma cutting a post-tensioned cable consistent with certain embodiments of the present disclosure.

A method of using a plasma cable cutting bracket according to an exemplary embodiment of the present disclosure is described in FIG. 3. At step 305, bracket 28 may be installed onto post-tensioned cable 16. For example, when bracket 28 is pressed against post-tensioned cable 16, the sloping faces of tabs 32 and 34 may engage post-tensioned cable 16. The force at this interface may cause tabs 32 and 34 to flex outwardly and apart from each other thereby creating space for post-tensioned cable 16 to pass therebetween and into the post-tensioned cable tunnel 38 of bracket 29. Upon moving into the post-tensioned cable tunnel 38, tabs 32 and 34 may tend to return to their resting position which may result in a retaining force being applied to the post-tensioned cable 16 sufficient to avoid rotation of bracket 28 relative to post-tensioned cable 16 along a longitudinal axis of post-tensioned cable 16. At step 310, installed bracket 28 may be positioned axially along the longitudinal axis of post-tensioned cable 16. The axial positioning of bracket 28 may define the position of cutting tip 26 relative to post-tensioned cable 16, and therefore define where post-tensioned cable 16 will be cut. In exemplary embodiments, it may be preferred to minimize the length of the free end (cut end) of post-tensioned cable 16. Accordingly, in exemplary embodiments, a distal face of bracket 28 may abut a proximal face of cable gripping wedges 18 as evident in FIG. 1. This exemplary positioning may minimize the length of the free end of post-tensioned cable 16 after cutting. In exemplary embodiments, the length of the free end of post-tensioned cable 16 may be determined by setting the length of post-tensioned cable tunnel 38. For example, a bracket 28 with a relatively shorter post-tensioned cable tunnel 38 will result in cutting tip 26 addressing post-tensioned cable 16 in a relatively closer position to cable gripping wedges 18. In an exemplary embodiment, the axial distance from cutting tip 26 to the proximal faces of cable gripping wedges 18 is at or around 1.5 inches.

Once positioned axially, at step 315, the plasma torch may be used to cut the post-tensioned cable 16. For example, cutting tip 26 may address post-tensioned cable 16 in the desired cutting location. Post-tensioned cable 16 may have a diameter that exceeds the cutting width of cutting tip 26. As a result, activating the plasma torch 20 may result in an incomplete cut of post-tensioned cable 16. However, as discussed above, plasma torch attachment member 30, and therefore plasma torch 20, can rotate or twist on a longitudinal axis defined by the hole in bracket 28 where plasma torch attachment member 30 connects to bracket 28. Rotation of plasma torch 20 changes the direction of cutting tip 26 relative to post-tensioned cable 16. The rotation of plasma torch 20 is sufficient to sweep cutting tip 26 through an arc that covers the entire thickness of post-tensioned cable 16 without moving bracket 29, resulting in a complete cut of post-tensioned cable 16. Once each of the post tensioned cables of FIG. 1 are cut, the ends may be covered with a grout cap to secure them from corrosion.

The foregoing outlines features of several embodiments so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the embodiments introduced herein. One of ordinary skill in the art should also realize that such equivalent constructions do not depart from the spirit and scope of the present disclosure and that they may make various changes, substitutions, and alterations herein without departing from the spirit and scope of the present disclosure.

EMBODIMENTS

1. An apparatus for positioning a plasma cutting torch to cut off a free end of a post-tensioned cable embedded in a concrete body, said apparatus comprising:
   a bracket having a post-tensioned cable tunnel and a pair of tabs configured to receive the post-tensioned cable and to prevent rotation of the bracket relative to the post-tensioned cable; and
   a plasma torch attachment member configured to:
     releasably engage with a head of a plasma cutting torch of the type having a plasma cutting tip attached thereto; and
     rotatably attach to the bracket such that the plasma cutting tip may be moved in an arc relative to the post-tensioned cable.
2. The apparatus of claim 1, wherein each tab of the pair of tabs has an exterior sloping face configured to provide a force for flexing the pair of tabs apart when the bracket is pushed against the post-tensioned cable.
3. The apparatus of claim 1, wherein each tab of the pair of tabs has an interior face configured to create a retention force when the post-tensioned cable is seated in the post-tensioned cable tunnel.
4. The apparatus of claim 3, wherein the pair of tabs is further configured to allow the bracket to slide along a longitudinal axis of the post-tensioned cable.
5. The apparatus of claim 1, wherein a distal surface of the bracket is configured to abut a proximal surface of a plurality of cable gripping wedges.
6. The apparatus of paragraph 1, wherein the arc of the plasma cutting tip is configured to be sufficient to cut a full diameter of the post-tensioned cable without moving the bracket.
7. The apparatus of paragraph 1, wherein the bracket is configured to position the plasma cutting tip a set distance from a plurality of cable gripping wedges.
8. The apparatus of paragraph 1, wherein the bracket is configured to position the plasma cutting tip a minimum distance from a circumferential surface of the post-tensioned cable.
9. A method for utilizing a plasma cutting torch to cut off a free end of a post-tensioned cable embedded in a concrete structure, said method comprising:
   pushing a plasma cutting apparatus onto the post-tensioned cable, the plasma cutting apparatus comprising:
     a bracket having a post-tensioned cable tunnel and a pair of tabs configured to receive the post-tensioned cable and to prevent rotation of the bracket relative to the post-tensioned cable; and
     a plasma torch attachment member configured to releasably engage with a head of a plasma cutting torch of the type having a plasma cutting tip attached thereto and rotatably attach to the bracket such that the plasma cutting tip may be moved in an arc relative to the post-tensioned cable;
   positioning the bracket along a longitudinal axis of the post-tensioned cable, such positioning defining a cutting point on the post-tensioned cable; and
   rotating the plasma cutting torch as the torch is engaged to cut a full diameter of the post-tensioned cable.
10. The method of paragraph 9, wherein each tab of the pair of tabs has an exterior sloping face configured to provide a force for flexing the pair of tabs apart when the bracket is pushed against the post-tensioned cable.
11. The method of paragraph 9, wherein each tab of the pair of tabs has an interior face configured to create a retention force when the post-tensioned cable is seated in the post-tensioned cable tunnel.
12. The method of paragraph 11, wherein the pair of tabs is further configured to allow the bracket to slide along a longitudinal axis of the post-tensioned cable.
13. The method of paragraph 9, wherein a distal surface of the bracket is configured to abut a proximal surface of a plurality of cable gripping wedges.
14. The method of paragraph 9, wherein the arc of the plasma cutting tip is configured to be sufficient to cut the full diameter of the post-tensioned cable without moving the bracket.
15. The method of paragraph 9, wherein the bracket is configured to position the plasma cutting tip a set distance from a plurality of cable gripping wedges.
16. The method of paragraph 9, wherein the bracket is configured to position the plasma cutting tip a minimum distance from a circumferential surface of the post-tensioned cable.

The invention claimed is:
1. A plasma torch attachment device comprising:
   a bracket comprising a proximal end and a distal end;
   wherein the proximal end comprises a plasma torch attachment member to engage with a plasma torch cutting head; and
   wherein the distal end comprises a releasably engageable positioning device to releasably hold a post-tensioned cable to be cut, comprising a pair of tabs configured to receive the post-tensioned cable and to prevent rotation of the bracket relative to the post-tensioned cable, wherein each tab of the pair of tabs has an exterior sloping face configured to provide a force for flexing the pair of tabs apart when the bracket is pushed against the post-tensioned cable.
2. An apparatus for positioning a plasma cutting torch to cut off a free end of a post-tensioned cable embedded in a concrete body, said apparatus comprising:
   a bracket having a post-tensioned cable tunnel and a pair of tabs configured to receive the post-tensioned cable and to prevent rotation of the bracket relative to the post-tensioned cable, wherein each tab of the pair of tabs has an exterior sloping face configured to provide a force for flexing the pair of tabs apart when the bracket is pushed against the post-tensioned cable; and
   a plasma torch attachment member configured to:
   releasably engage with a head of a plasma cutting torch of the type having a plasma cutting tip attached thereto; and
   rotatably attach to the bracket such that the plasma cutting tip can be moved in an arc relative to the post-tensioned cable.
3. The apparatus of claim 2, wherein each tab of the pair of tabs has an interior face configured to create a retention force when the post-tensioned cable is seated in the post-tensioned cable tunnel.
4. The apparatus of claim 3, wherein the pair of tabs is further configured to allow the bracket to slide along a longitudinal axis of the post-tensioned cable.
5. The apparatus of claim 2, wherein a distal surface of the bracket is configured to abut a proximal surface of a plurality of cable gripping wedges.

6. The apparatus of claim 2, wherein the arc of the plasma cutting tip is configured to be sufficient to cut a full diameter of the post-tensioned cable without moving the bracket.

7. The apparatus of claim 2, wherein the bracket is configured to position the plasma cutting tip a set distance from a plurality of cable gripping wedges.

8. The apparatus of claim 2, wherein the bracket is configured to position the plasma cutting tip a minimum distance from a circumferential surface of the post-tensioned cable.

9. A method for cutting a tensioned cable comprising:
attaching a proximal end of a bracket to a plasma torch cutting head and attaching a distal end of the bracket to the tensioned cable to be cut; and
cutting the tensioned cable with the plasma torch cutting head;
wherein the proximal end of the bracket comprises a plasma torch attachment member to engage with the plasma torch cutting head; and
wherein the distal end of the bracket comprises a releasably engageable positioning device to releasably hold the tensioned cable to be cut, comprising a pair of tabs configured to receive the post-tensioned cable and to prevent rotation of the bracket relative to the post-tensioned cable, wherein each tab of the pair of tabs has an exterior sloping face configured to provide a force for flexing the pair of tabs apart when the bracket is pushed against the post-tensioned cable.

10. A method for utilizing a plasma cutting torch to cut off a free end of a post-tensioned cable embedded in a concrete structure, said method comprising:
pushing a plasma cutting apparatus onto the post-tensioned cable, the plasma cutting apparatus comprising:
a bracket having a post-tensioned cable tunnel and a pair of tabs configured to receive the post-tensioned cable and to prevent rotation of the bracket relative to the post-tensioned cable, wherein each tab of the pair of tabs has an exterior sloping face configured to provide a force for flexing the pair of tabs apart when the bracket is pushed against the post-tensioned cable; and
a plasma torch attachment member configured to releasably engage with a head of a plasma cutting torch of the type having a plasma cutting tip attached thereto and rotatably attach to the bracket such that the plasma cutting tip can be moved in an arc relative to the post-tensioned cable;
positioning the bracket along a longitudinal axis of the post-tensioned cable, such positioning defining a cutting point on the post-tensioned cable; and
rotating the plasma cutting torch as the torch is engaged to cut a full diameter of the post-tensioned cable.

11. The method of claim 10, wherein each tab of the pair of tabs has an interior face configured to create a retention force when the post-tensioned cable is seated in the post-tensioned cable tunnel.

12. The method of claim 11, wherein the pair of tabs is further configured to allow the bracket to slide along a longitudinal axis of the post-tensioned cable.

13. The method of claim 10, wherein a distal surface of the bracket is configured to abut a proximal surface of a plurality of cable gripping wedges.

14. The method of claim 10, wherein the arc of the plasma cutting tip is configured to be sufficient to cut the full diameter of the post-tensioned cable without moving the bracket.

15. The method of claim 10, wherein the bracket is configured to position the plasma cutting tip a set distance from a plurality of cable gripping wedges.

16. The method of claim 10, wherein the bracket is configured to position the plasma cutting tip a minimum distance from a circumferential surface of the post-tensioned cable.

* * * * *